United States Patent Office 3,566,687
Patented Mar. 2, 1971

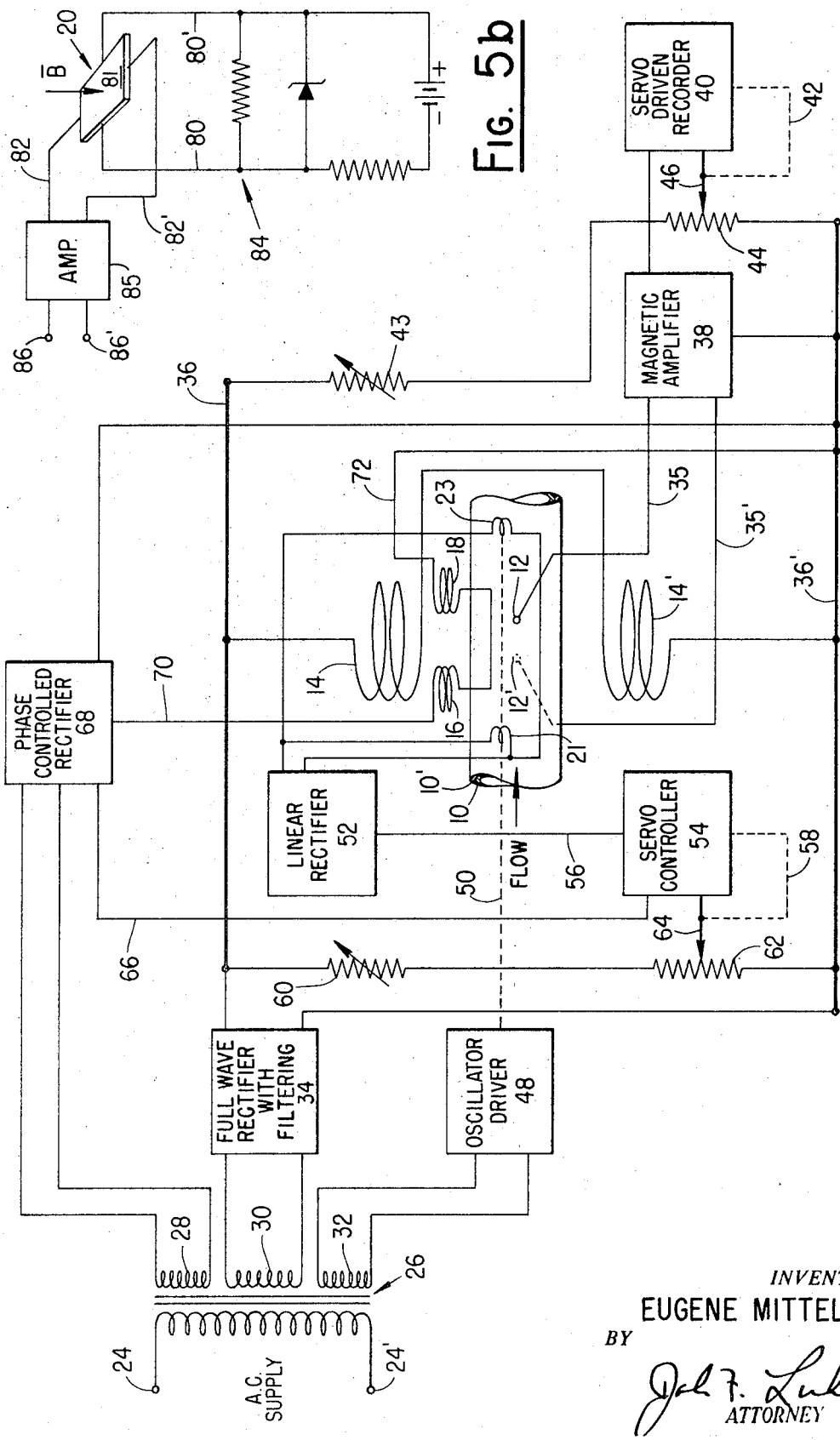

3,566,687
ELECTROMAGNETIC FLOWMETER FOR METALLIC FLUIDS
Eugene Mittelmann, Chicago, Ill., assignor to Bailey Meter Company
Filed Oct. 29, 1969, Ser. No. 872,001
Int. Cl. G01p 5/08
U.S. Cl. 73—194
13 Claims

ABSTRACT OF THE DISCLOSURE

An apparatus for measuring the volumetric flow rate of metallic fluids in a conduit with a feedback compensating system which maintains the magnetic flux distribution in the conduit relatively constant. A device for the detection of D.C. magnetic fields and a pair of electromagnet coils, producing the magnetic flux field, are so positioned that the magnetic field detecting device generates a signal representative of any change in magnetic flux density in the conduit, near the termination of the magnetic field along the flow axis. This signal is then coupled to a servo-controller, and the servo-controller outputs an error control signal proportional to the magnetic field shift along the flow axis caused by magneto-hydrodynamic effects of the moving liquid metal. A pair of compensating coils, energized by the servo-controller and magnetically coupled to the field producing coils, are polarized so as to sustain the magnetic flux density near the termination of the magnetic field at substantially the same relative value, as for zero fluid motion, in order to provide a linear indication of flow independent of the electrical currents circulating in the moving metallic fluid.

BACKGROUND OF THE INVENTION

Field of the invention

The present invention relates generally to electromagnetic flowmeters, and, more particularly, to an electromagnetic flowmeter of the type in which an electrical signal is induced in a conductive fluid flowing through a relatively constant magnetic flux field, the induced electrical signal having a calibration characteristic which provides a linear indication of the volumetric flow rate of the fluid.

The invention is particularly useful for providing a linear indication of the volumetric flow rate of liquid sodium and will be described with particular reference thereto although it will be appreciated that the invention has broader applications such as where either a variety of metallic fluids is to be measured or the operating temperature of any given metallic fluid varies causing its conductivity to change during the flow measurement.

Description of the prior art

Electromagnetic flowmeters have heretofore comprised a flow conduit, exciter means for establishing a magnetic field substantially perpendicular to the direction of fluid flow, means for sensing an electrical signal induced by fluid flow through the magnetic field and means for responding to the sensing means to provide an output indication of fluid flow.

In such a flowmeter, the exciter means for establishing the magnetic field has taken the form of either a D.C. exciter or an A.C. exciter. The D.C. exciter produces a magnetic field having a steady amplitude and direction, a D.C. voltage being induced in the fluid having an instantaneous amplitude which is directly proportional to the volumetric flow rate of non-metallic fluids in certain apparatus configurations known in the art. In contrast, the A.C. exciter produces a magnetic field having a variable amplitude which alternates or periodically reverses its direction, an A.C. voltage of the same frequency as the exciter means being induced in the fluid.

An A.C. exciter means is generally preferred over the D.C. exciter means because with the D.C. exciter means the sensing means, i.e. electrodes, become polarized due to an accumulation of an electrical charge thereon, and this charge severely limits the accuracy of the flowmeter. This problem of charge accumulation is virtually nonexistent when the volumetric flow rate of metallic fluids is to be measured since the moving metallic fluid carries the charge with it away from the electrodes. The use of D.C. exciter means is thus a viable method of excitation in liquid metal flowmeters. A.C. exciter means, moreover, are not particularly suitable for liquid metal flowmeters because of the occurrence of eddy currents generated in the liquid metal mass. Also there is the added phenomenon of skin effect, which means that the field would not fully penetrate into the interior of the fluid under various conditions.

Two of the principal problems inherent in the operation of electromagnetic flowmeters, when used for measuring the volumetric flow rate of liquid metals, are that the magnetic flux field produced by the exciter means is distorted and also is displaced downstream, along the flow axis, under the action of the moving fluid. These changes in the magnetic flux field have been causatively related, by experts in the art, to currents circulating in the moving metallic fluid. Notable among these experts are: Hartman, J. and Lazarus, F., "Theory of the Laminar Flow of an Electrically Conductive Liquid in a Homogeneous Magnetic Field," Hg-dynamics I (1937), Math-fys., Medd. 15, No. 7 and Shercliff, J. A., "Edge Effects in Electromagnetic Flowmeters," Journal of Nuclear Energy I (1956), vol. 3, pp. 305–311, Pergamon Press Ltd., London. These two papers document and predict the non-linear output characteristics of metallic fluid measuring electromagnetic flowmeters and show that several factors simultaneously contribute to the problem. Some of inter-related factors which contribute to the non-linear output characteristics include the following: (1) the dimensions and distribution of the exciting magnetic flux field traversing the flow conduit; (2) the ratio of the flux field to the diameter of the flow conduit; (3) the distortion and displacement of the flux field, from that present when the fluid is at rest due to eddy currents generated upstream and downstream of the sensing means (i.e. electrodes), when the fluid is in motion; (4) the distribution of the electromotoric (electromotive) forces generated at any point in the moving fluid within the flux field which contribute with a differential weight (weighting function) to the total signal output at the electrodes; and, (5) the electrical conductivity of the fluid as determined primarily by its composition and its temperature.

The present invention contemplats new and improved apparatus which overcomes all of the above referred problems and others and provides a compensated electromagnetic flowmeter for linearly and accurately measuring the volumetric flow rates of liquid metals.

SUMMARY OF THE INVENTION

In accordance with the present invention, an electromagnetic flowmeter of the general type described is provided, additionally comprising: means, coupled to the magnetic field established by the exciter means, for providing a reference signal directly proportional to the magnetic flux density near the termination of the magnetic field along the flow axis; and, means for compensating the magnetic flux density near the termination of the magnetic field along the flow axis, the compensating means responding to the reference signal to cause the field intensity to remain substantially constant, resulting in an output indication from the responding means which is linearly proportional to the flow of a metallic fluid in a manner substantially independent of the magneto-hydrodynamic effects of the moving fluid.

Also, in accordance with the invention, the means for producing a reference signal includes means for detecting a D.C. field coupled to the magnetic flux field of the exciter means such as an oscillating search coil, a heat insulated magneto diode or a heat insulated Hall generator.

Further, in accordance with the invention, an electromagnetic flowmeter as described above is provided wherein the compensating means includes means for magnetically sustaining the magnetic flux density, near the termination of the magnetic field along the flow axis, to provide substantially the same relative flux distribution present when the fluid is at rest in the conduit so that the compensating means acts in proportional opposition to the direction of displacement of the magnetic field, along the flow axis, caused by the action of electrical currents circulating in the moving fluid.

Still further, in accordance with the invention, an electromagnetic flowmeter as described above is provided wherein the magnetic sustaining means includes a first electromagnet disposed downstream of the sensing means and a second electromagnet disposed upstream of the sensing means with both of the electromagnets being coupled to the exciter means, the downstream electromagnet being polarized with respect to the exciter means to substantially cancel that portion of the magnetic flux field shifted downstream under the action of moving fluid and the upstream electromagnet being polarized with respect to the exciter means to substantially replace that portion of the magnetic flux field present when the fluid in the flow conduit is at rest.

The principal object of the present invention is to provide an electromagnetic flowmeter for accurately measuring the volumetric flow rate of metallic fluids.

Another important object of the invention is to provide an electromagnetic flowmeter with a feedback compensating system which cancels the magneto-hydrodynamic effects of the moving metallic fluid, on the magnetic excitation field, in direct proportion to volumetric flow rate and temperature of the fluid.

BRIEF DESCRIPTION OF THE DRAWINGS

FIG. 5 is a schematic illustration of an electromagnetic flowmeter system for measuring the volumetric flow rate of metallic fluids, according to one embodiment of the present invention.

FIG. 5b is a schematic illustration of an alternative arrangement for producing a reference signal in the system of FIG. 5.

DESCRIPTION OF THE PREFERRED EMBODIMENTS

Figure 1A:
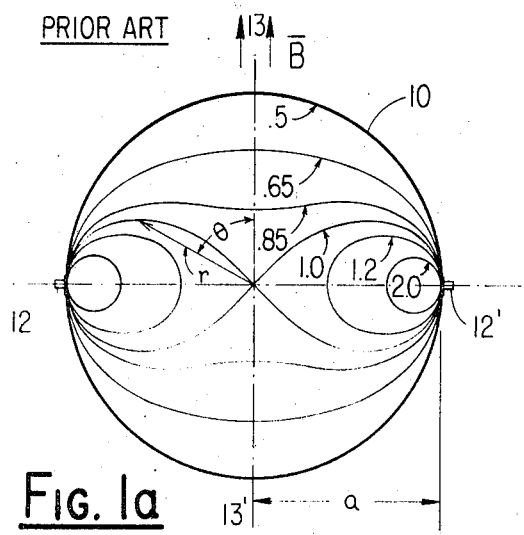
FIGS. 1a–f are a series of cross-sectional views of the weighting function distribution in a flow conduit and a series of related characteristic curves.

Referring now to the drawings wherein the showings are for the purposes of illustrating the preferred embodiments of the invention only and not for the purposes of limiting same, FIG. 1a is a cross-sectional view of a flow conduit 10 including a pair of electrodes 12, 12' defining an electrode axis. A vertical axis 13, 13', perpendicular to the electrode axis, divides the circular cross-sectional area within the flow conduit 10 into four equal cross-sectional quadrants. Two arrows along the axis 13, 13' show the direction of magnetic flux density $\overline{B}$ which is distributed throughout the cross-sectional area within the conduit 10.

FIG. 1a also shows a plurality of contour lines which are numerically weighted. The significance of these contour lines and their numerical weight, as a decimal number, will soon become apparent. As early as 1930, a distinction was made between the potential difference between two points in a liquid and the electromotoric force as defined with reference to magnetic flow measurement. The quantity that is measured by an electromagnetic flowmeter is the potential difference at opposite ends of a diameter of the conductive fluid in the flow conduit 10 which is sensed by the electrodes 12, 12'. This potential difference is the summation of all of the electromotoric forces induced in the moving fluid within the effective magnetic flux field $\overline{B}$ in the flow conduit 10. This distinction was recognized in the pioneering publication by Williams, E. J., "The Induction of E.M.F's in a Moving Fluid by a Magnetic Field and its Application to an Investigation of the Flow of Liquids," Proc. Phys. Soc., London (1930), p. 42, p. 466.

The electromotoric forces induced in the moving liquid are at any point proportional to the liquid velocity and to the field strength, and the voltage available at the electrodes is the result of contributions of electromotoric forces generated at any point within the flow conduit 10 through the vectorial cross product of field strength and fluid velocity. If one considers these contributions of elementary electromotoric forces, it then becomes apparent that a three-dimensional potential dividing network is formed in the volume of the liquid within the effective magnetic flux field $\overline{B}$, each differential volume element of the liquid contributing a differential of voltage with a certain weight to form the total signal voltage between the electrodes 12, 12'.

In FIG. 1a, the numerically weighted contour lines represent equipotential lines expressed in units of the potential prevailing in the center, the shape of the contour lines being determined by the characteristic of the potential dividing network. FIG. 1a holds true under the simplifying assumption of the two-dimensional case in the plane of the electrodes. This concept of a weighting function was first introduced in a publication by Shercliff, J. A., "The Theory of Eelectromagnetic Flow Measurement," Cambridge University Press (1962). In the two-dimensional situation depicted in FIG. 1a, an assumption is made that either the effective magnetic flux field $\overline{B}$ is substantially a two-dimensional field in the plane of the electrodes 12, 12' or that the magnetic flux field $\overline{B}$ extends symmetrically upstream and downstream from the electrode axis, along the flow axis. Under the latter assumption, all of the potential dividing networks formed in planes parallel to the electrode plane are reflected to the electrode plane to give the resulting distribution as shown. An expression for the weighting function of FIG. 1a is given in Equation 1.

$$W = \frac{a^4 + a^2 r^2 \cos 2\theta}{a^4 + 2a^2 r^2 \cos 2\theta + r^4} \qquad (1)$$

Where:

$W$ = the numerical weight of a contour line expressed as a decimal integer;
$a$ = the radius of the flow conduit 10;
$r$ = the radial extent to any point on any contour line; and,
$\theta$ = the angle included between the vertical axis 13, 13' and the radial extension $r$.

This concept of a weighting function and the derivation of Equation 1 was introduced in the above cited 1962 publication by Shercliff.

Figure 1B:
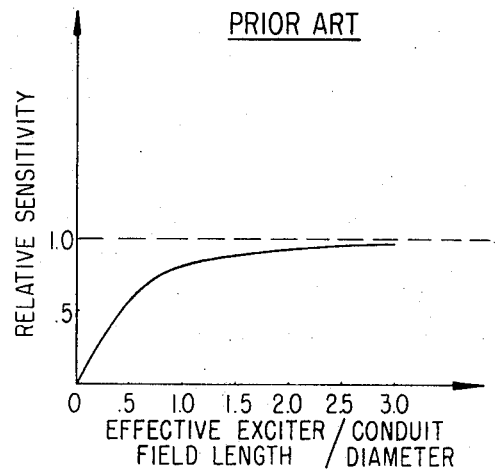

Another concept introduced by Shercliff is that of flowmeter sensitivity. This is defined as the ratio of the signal voltage available between the electrodes to the voltage actually induced by the magnetic flux field. This concept of sensitivity takes into account the influence of induced currents in the fluid flowing between the electrodes within the flow conduit 10. The curve in FIG. 1b shows that the sensitivity approaches the value of unity asymptotically as the ratio of effective exciter field length to conduct diameter approaches the value of 3.0. An expression for this characteristic is presented in Equation 2.

$$S = \frac{\Delta E}{2aBv} = \left[1 - \frac{8}{\pi^2} \Sigma \frac{l}{n^2} \exp{-\frac{n\pi l}{4a}}\right] \quad (2)$$

Where:

S = the flowmeter sensitivity;
ΔE = the voltage available between the electrodes;
a = the radius of the flow conduit;
π = the numerical value for pi 3.1416;
l = the effective exciter field length from upstream to downstream of the electrode plane; and,
n = all odd positive integers, 1, 3, 5, etc.

Under the influence of these findings, most commercial electromagnetic flowmeters were designed with a field structure which would provide a ratio of effective exciter field length to conduit diameter of 3.0 or greater.

In the design of liquid metal electromagnetic flowmeters, particularly those flowmeters having a large diameter flow conduit, it is generally not practical to provide a field structure producing an effective exciter field length of three times the conduit diameter. Usually it is more practical to provide a field structure for these applications which provide an effective field length on the order of magnitude of between one and two conduit diameters. It should be recognized, that with an effective field length of this shortened dimension, the sensitivity characteristic of the electromagnetic flowmeter will change if for any reason the effective field length changes during a measurement of volumetric flow rate. This is precisely the problem inherent in the measurement of metallic fluids, and this problem will be more fully discussed subsequently.

Figure 1C:
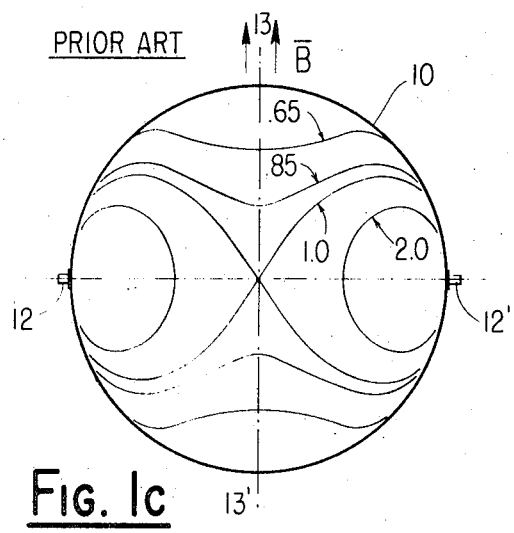
Figure 1D:
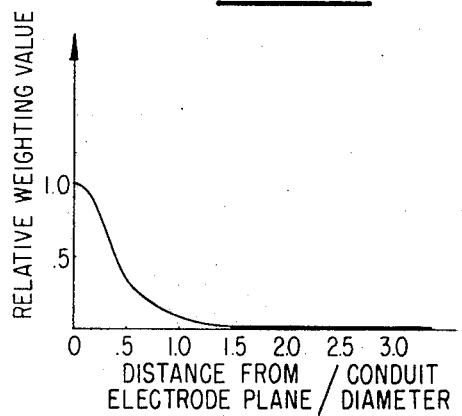
Figure 1E:
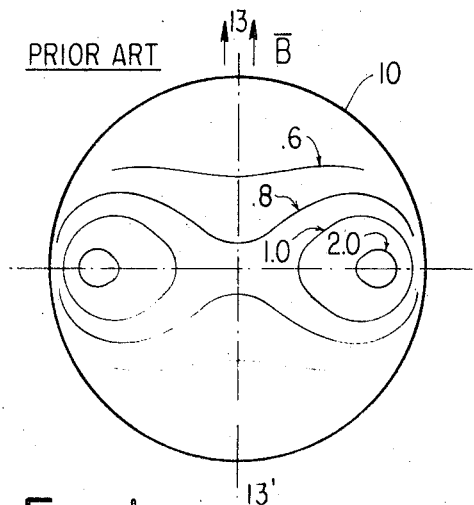

In a relatively recent publication by Rummel and Ketelsen in Regelungstchnik, volume 14 (1966), the results of an investigation of the weighting function carried out for the three-dimensional case was presented. A comparison of FIGS. 1c and 1e, shown in this publication, demonstrates how the numerically weighted contour lines change in planes parallel to the electrode axis. FIG. 1c shows the weighting function in the cross-sectional plane of the electrodes; the contour lines are similar but not identical to those shown in FIG. 1a. It should be remembered that the weighting function of FIG. 1a represents the total effect of the weighting function reflected, from planes parallel to the electrode plane in the effective magnetic flux field, to the electrode plane. FIG. 1c, however, represents the weighting function of only the electrode plane, and FIG. 1e similarly represents the weighting function in a plane parallel to the electrode plane removed .2 diameters of the flow conduit from the electrode plane.

Figure 1F:
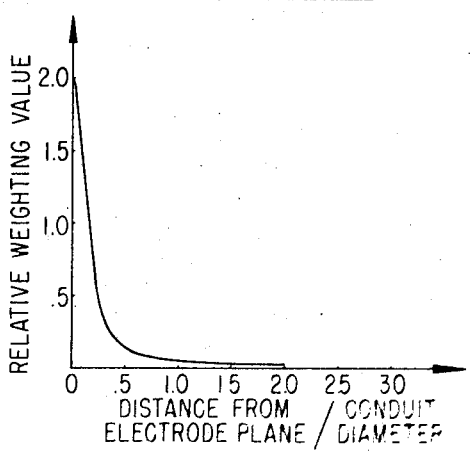

In view of these previous investigations, I have carried the investigation further in order to determine the distance from the electrode plane at which the individual weighting functions converge to zero or become negligible. The results of this investigation are shown in FIGS. 1d and 1f. The graph of FIG. 1d shows that the value of the weighting function at the center of the conduit decays rapidly, along the flow axis, as the ratio of distance from the electrode plane to the conduit diameter increases. FIG. 1f shows a similar decay of the weighting function starting at a numerical weighting value of 2.0 on the electrode plane axis which corresponds to one of the circular contour lines in FIG. 1c. My investigations have made evident that all weighting functions, regardless of their origin in the electrode plane, rapidly converge to zero once they reach a distance of about .75 flow conduit diameters from the electrode plane. The above discussion of weighting function and sensitivity with respect to electromagnetic flowmeters provides a basis for understanding and analyzing their operation, and, more importantly, it provide a framework for understanding the present invention.

As was stated above, the differential electromotoric forces induced in the moving fluid are proportional to the liquid velocity and to the field strength, and a potential difference exists between volumetric fluid elements laying in planes parallel to the electrode plane. As a consequence of the differences in potential between parallel planes within the effective magnetic field, as determined by the different weighting functions existing in parallel planes, both upstream and downstream of the electrode plane under the action of a moving metallic fluid. These current loops will have the greatest effect at both ends of the magnetic flux field, where the magnetic field intensity drops from a high to a low value. These currents will also be directional, e.g., in a counterclockwise direction at the upstream end of the field and in a clockwise direction at the downstream end of the field due to a reversal of the potential gradients from one edge of the field to the other.

In highly conductive fluids, the currents caused by the potential gradients at the edges of the field are of a relatively high magnitude so that there is considerable distortion of the exciting magnetic flux field by the flux fields associated with these circulating currents. Shercliff derived an expression for the magnitude of these currents as set forth in Equation 3, which was presented in his above cited publication of 1956.

$$J = .37vBa\sigma \quad (3)$$

Where:

J = the current density in amperes per cubic centimeter;
v = the velocity of fluid flow in centimeters per second;
B = the magnetic field intensity in Gauss;
a = the radius of the flow tube in centimeters; and,
σ = the conductivity of the fluid in mhos per centimeter.

A measure of the tendency of the currents flowing in a conducting fluid to drag the magnetic flux field downstream is called the magnetic Reynolds number and is expressed in Equation 4.

$$R = 4\pi\mu\sigma av \quad (4)$$

Where:

R = the magnetic Reynolds number;
μ = the magnetic permeability of the fluid (that of a vacuum for non-magnetic fluids); and, the other terms are as defined above.

The approximate ratio of field distortion due to the circulating currents in the moving fluid is given by Equation 5 in the terms of the above equations.

$$\frac{4\pi\mu J}{B} = .37R \quad (5)$$

The expression for R in Equation 4 shows that its value increases directly proportional to the radius of the flow conduit and directly proportional to the flow velocity. The current density of the circulating currents as expressed by Equation 3 shows that the velocity of fluid flow and conductivity are the critical dynamic variables with respect to the generation of circulating currents, since the radius of the flow conduit is fixed for a particular flowmeter.

Figure 2:
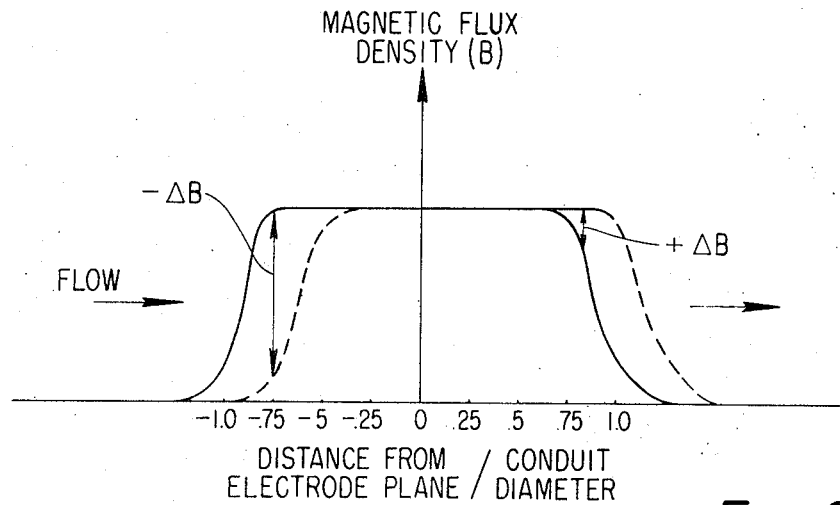
FIG. 2 illustrates the relative shift, along the flow axis, of magnetic flux distribution in the flow conduit under the magneto-hydrodynamic action of a moving metallic fluid.

Referring now to FIG. 2, the shift in magnetic flux density in the downstream direction under the action of metallic fluid flow is illustrated by the dashed curve. It should be recognized that the shifting of the field downstream causes a greater magnitude of magnetic flux density to appear at the downstream edge of the field as indicated by +ΔB and a smaller magnitude of magnetic flux density to appear at the upstream edge as indicated by −ΔB. The solid curve in FIG. 2 illustrates the relative position of the magnetic flux field when the fluid in the conduit is at rest.

As long as the magnetic field distribution is symmetrical with respect to the electrode plane, as shown by the solid curve in FIG. 2, a certain mean value of the volumetric flow rate will be measured at the electrodes as long as there is an axis symmetrical velocity profile for the fluid in the flow conduit. Axis symmetrical velocity profile means a constant value of fluid velocity around the periphery of any circle with an arbitrary radius measured from the flow axis in a plane perpendicular to the flow axis and within the domain of the effective magnetic field. If the fluid does not have an axis symmetrical velocity profile, further distortion of the magnetic flux field would be present.

Assuming that the shape of the field from edge to edge does not change substantially, but is only shifted downstream in proportion to the volumetric flow rate of the metallic fluid, increasing negative errors will result in proportion to the increasing flow rates. The increasing negative errors will be due to the change in the upstream magnetic flux field $-\Delta B$ as shown in FIG. 2, and thus the total contribution of the electromotoric forces from the upstream portion of the field will be less than they were when the fluid was at rest and the magnetic flux field was undisturbed. It should be remembered from FIGS. 1d and 1f that the contribution from the weighting function planes parallel to the electrode plane are significant to approximately .75 conduit diameters from the electrode plane. The portion of the magnetic field shifted downstream, however, does not provide a substantial change in the magnetic flux field as evidenced by the relatively minor change in magnetic flux as indicated $+\Delta B$. Therefore, a relatively small contribution to the flow signal is made by the increased field downstream of the electrode plane.

The problem of non-linear output indications in electromagnetic flowmeters when used to measure the volumetric flow rate of metallic fluids is intimately related to the shift in magnetic flux distribution occurring with increasing flow rates. The solution of this problem, according to the invention, is by providing a compensating magnetic flux field in such a way as to eliminate the effects of the field shift on the flow signal sensed by the electrodes.

Figure 3:
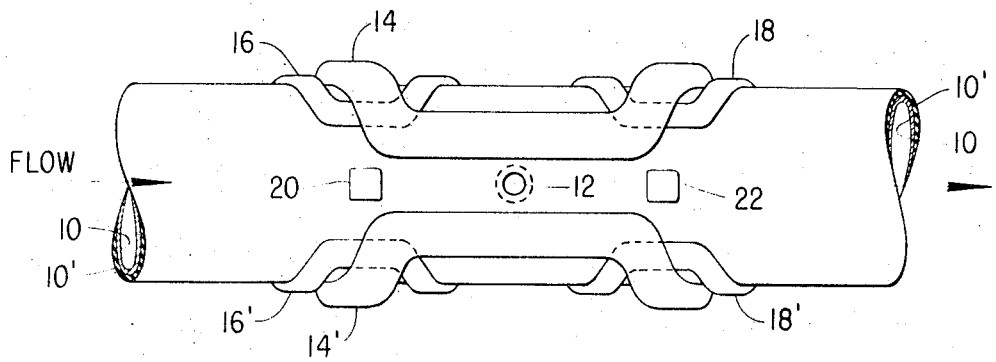
FIG. 3 is an elevational view illustrating the relative position of the coils mounted on the flow conduit according to one embodiment of the present invention.

Referring now to FIG. 3, a pair of exciter electromagnets 14, 14' straddle the flow conduit 10 symmetrical to the electrode axis 12, 12' in order to provide a vertical magnetic flux field within the flow conduit 10. The flow conduit 10 is made from high temperature stainless steel or another appropriate heat resistant, non-magnetic material. A tubing 10' of heat barrier material, in an appropriate thickness, covers the exterior surface of flow conduit 10 in order to heat insulate the electromagnets 14, 14' and other components external to the flow conduit 10. The tubing 10' is a rubber-like composition suspending non-magnetic ceramic particles in it. This rubber-like suspension may be applied to the flow conduit 10 by brushing to an appropriate thickness, e.g. 0.5 inch, and after hardening will insulate temperature differentials of about 2000° F.

The length of the exciter electromagnets 14, 14', in the direction of the flow axis, is such as to provide a total effective field length of approximately 1.5 conduit diameters, .75 conduit diameters on each side of the electrode plate. A pair of compensating electromagnets 16, 16' are disposed upstream of the electrode plane and a pair of compensating electromagnets 18, 18' are disposed downstream of the electrode plane. An upstream field monitoring device 20 and a downstream field monitoring device 22 are located adjacent to the heat barrier tubing 10' over the flow conduit 10 near the flow axis termination of the effective magnetic field. The monitoring devices 20, 22 are adapted to regulate the current to the compensating coils 16, 16' and 18, 18' through a feedback arrangement, later to be described with reference to FIG. 5. This feedback arrangement is used to eliminate the effects of magnetic field shift.

This solution to magnetic field shift, according to the embodiment shown in FIG. 3, is predicated on the fact that the exciter electromagnets 14, 14' have ampere turns disposed in planes parallel to the current circulating in the moving liquid within the conduit 10. A magnetic flux linkage exists between the ampere turn loops and the circulating currents as evidenced by the fact that field distortion occurs in the magnetic flux field at increasing flow rates. The provision of additional ampere turns in the form of compensating electromagnets of the proper dimensional geometry and position, relative to the main exciting ampere turns, cancels the circulating eddy currents. This is done by properly polarizing the currents in the compensating coils and by making their amplitude a function of flow rate. The additional ampere turns in the form of compensating electromagnets restore the field to the reference value, thus eliminating the effects of the circulating eddy currents.

Figure 4:
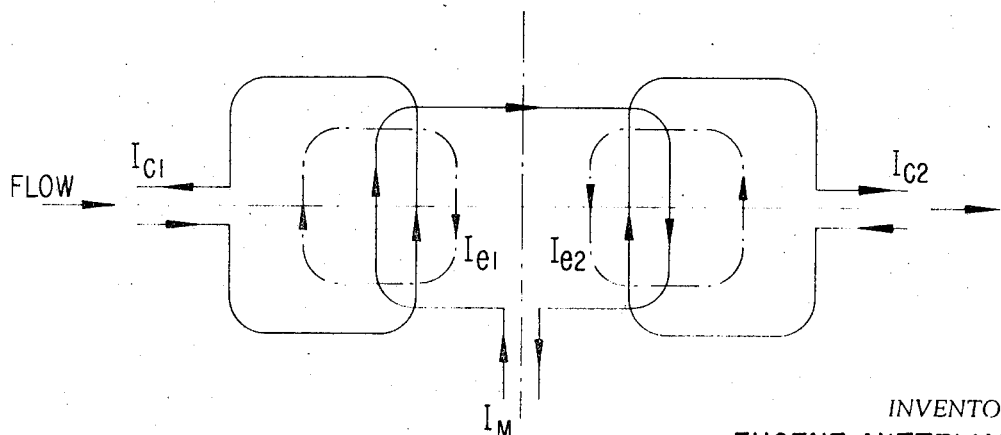
FIG. 4 is a schematic illustration of the currents in the coils of FIG. 3 relative to the relevant eddy currents generated in the moving metallic fluid.

Referring now to FIG. 4, the relative directions of the currents flowing in the electromagnets of FIG. 3 are illustrated with respect to the circulating eddy currents in a moving metallic fluid. The exciter electromagnets 14, 14' carry the current $I_M$ in their ampere turns in a clockwise direction. The compensating electromagnets 16, 16' carry the current $I_{C1}$ in their ampere turns in a counterclockwise direction to cancel out the effects of the eddy currents $I_{e1}$ circulating in the clockwise direction upstream of the electrode plane. In a similar fashion, the compensating electromagnets 18, 18' carry the current $I_{C2}$ in a clockwise direction to cancel out the effects of the counterclockwise circulating eddy currents $I_{e2}$ downstream of the electrode plane. The provision of the monitoring coils 20, 22 as shown in FIG. 3 are such as to monitor the magnetic field within the fringing areas at the edges of the exciter field, in order to maintain the magnetic flux density and relative distribution thereof substantially the same as when the fluid is at rest.

Referring now to FIG. 5, a schematic illustration of an electromagnetic flowmeter system for liquid metals is presented according to one embodiment of the present invention. This system is particularly adapted to providing a linear output indication of the volumetric flow rate of liquid sodium and other metallic fluids having high fluid conductivity to fluid density ratios. The arrangement of the exciter electromagnets 14, 14' with respect to the flow conduit 10 is similar to that shown in FIG. 3, and the design of these electromagnets may be such as to minimize the effects of non-axis symmetrical flow profiles. The use of the heat barrier tubing 10' is preferable but not mandatory in this embodiment of the system.

With reference to FIG. 5 note that only two compensating electromagnets 16, 18 are utilized, and it should be obvious from the above discussion that the compensating electromagnet 16, by itself, is sufficient to eliminate the most substantial effects of non-linearity of the output indication. The above statement should be considered with reference to FIG. 2 and the comments related thereto describing the relatively greater change in magnetic flux density in the important magentic field edge region upstream of the electrode plane as compared with the relatively smaller change in magnetic flux density at the same distance downstream.

An alternating current source of supply voltage is connected to the primary winding of a transformer 26 across terminals 24, 24'. The transformer 26 has three secondary windings 28, 30, 32, and the winding 30 is used to energize a suitably filtered full wave rectifier 34 to provide a D.C. output voltage of a preselected magnitude. A pair of bus bars 36, 36' are connected to this D.C. output voltage, and the exciter electromagnets 14, 14' are connected to be energized thereby. Exciter electromagnets 14, 14' have magnetically permeable core members (not shown) of sufficient dimensions to create a D.C. magnetic flux field within flow conduit 10 having an effective total length of approximately 1.5 flow conduit diameters. A pair of electrodes 12, 12' are inserted through the conduit walls, midway between the edges of the field, in order to make contact with the fluid therein, and these electrodes are connected to a magnetic amplifier 38 over connecting lines 35, 35'. The magnetic amplifier 38 is a D.C. to D.C. converter with linear characteristics so as to provide an amplified output signal directly proportional to the flow signals. The magnetic amplifier also provides electrical isolation of the output signal from the rest of the system.

As in all electromagnetic flowmeter systems using a magnet coil type excitation for the generation of the magnetic flux field, field intensity variations caused by A.C. supply voltage fluctuations must be minimized. In order to make the output indication independent of supply voltage variations, a voltage dividing network including a variable resistor 43 in series with a potentiometer 44 is connected across the bus bars 36, 36' in parallel with the exciter electromagnets. The potentiometer 44 has a movable contact 46 which is mechanically controlled in order to provide a variable reference voltage. The voltage available across the output of the magnetic amplifier 38 is connected in series opposition with the voltage between the movable contact 46 and bus bar 36' to form an input to a servo-driven recorder 40. The servo-driven recorder 40 has a mechanical linkage 42 which positions the movable contact 46 so that the output indication of recorder 40 does not reflect any changes in supply voltage variations. The variable resistor 43 is so adjusted that movable contact arm 46 will reach an end position on potentiometer 44 at the full rated volumetric flow rate of the system.

An upstream monitoring coil 21 and downstream monitoring coil 23 are connected in parallel to the input of a linear rectifier 52. Since the upstream compensating coil 16 is substantially more important in its operation than the downstream compensating coil 18, the same may be said with respect to the monitoring coils, and the downstream monitoring coil 23 could be eliminated. The secondary winding 32 of transformer 26 energizes an oscillator driver 48 mechanically linked by linkage 50 to the monitoring coils 21, 23. The oscillator driver linkage 50 is such as to cause the monitoring coils, located within the fringing areas of the magnetic flux field of the exciter electromagnets, to be either vibrated or rotated at a preselected rate. This oscillating action of a coil in a D.C. magnetic field is such as to cause an A.C. voltage to be induced in the coils 21, 23 which is directly proportional to the rate of oscillation and the density of the magnetic flux field. A linear rectifier 52 converts the A.C. signal from the monitoring coils to a D.C. voltage which is directly proportional thereto, and this voltage is connected on line 56 to the input of a servo controller 54.

A voltage divider network including a variable resistor 60 in series with a potentiometer 62 is also connected across the bus bars 36, 36'. The potentiometer 62 has a movable contact 64 which is mechanically linked and controlled by a servo-controller 54 through linkage 58. An error control voltage is outputted from servo controller 54 and inputted on line 66 to a phase-controlled rectifier 68, the latter being energized by the secondary winding 28 of transformer 26. The output voltage of the rectifier 68 is phase responsive to the output signal from the servo controller 54 in order to provide a variable D.C. output voltage on line 70 to energize the compensating electromagnets 16, 18. The windings of the compensating electromagnets 16, 18 about magnetically permeable core members (not shown) are such as to provide ampere turns which oppose the effects of the circulating eddy currents generated upstream and downstream of the electrode plane. The variable resistor 60 is adjusted so as to cause the servo controller 54 to position the movable contact 64 at a mid-position setting on potentiometer 62 corresponding to fluid at rest in the flow conduit 10, and proportionally controlled deviations therefrom occur at increasing volumetric flow rates.

As the volumetric flow rate increases from zero, the magnetic field begins to be distorted and shifted downstream because of the various magneto-hydrodynamic effects of the moving metallic fluid. The monitoring coils 21, 23 oscillating in the fringing areas of the magnetic flux field respond to the field changes caused by the circulating eddy currents and causes linear rectifier 52 to output a corresponding D.C. output voltage. The servo controller 54 responds to this value of D.C. voltage and changes the position of the movable contact 64 accordingly. An error control voltage is output from the servo controller 54 to control the magnitude of the output voltage from rectifier 68. The compensating coils 16, 18 create compensating magnetic flux fields in response thereto in order to cancel the effects of magnetic flux fields generated by the current circulating in the fluid and conduit.

Equivalent means for providing a reference signal directly proportional to the magnetic flux density may be provided in place of the oscillating search coils 21, 23. These equivalent means include either a heat insulated magneto diode or a heat insulated Hall generator to detect the changing magnetic fields. The heat insulation from the flow conduit 10 for these monitoring devices is provided by the heat barrier tubing 10'. The magnetic diode device is arranged in a two-terminal pair network and is exposed to the relevant magnetic fields. A constant voltage is impressed across one pair of terminals and the current output signal through the other pair of terminals changes as a function of the varying magnetic fields.

The Hall generator device 20, as illustrated in FIG. 5b, is similarly arranged in a two-terminal pair network and is exposed to the relevant magnetic fields. A constant current is connected through one pair of terminals 80, 80', connected to a semi-conductor wafer 81, and the voltage output signal across another pair of terminals 82, 82' of the wafer 81 changes as a function of the varying magnetic fields. The wafer 81 is sensitive to variations of the magnetic field $\overline{B}$ perpendicular to the surface of the wafer. The constant current for the terminals 80, 80' is derived from a stabilized current source circuit 84 arranged in a conventional manner. Solid state rectifier circuits and mercury cells may also be used in the current source circuit 84. A stabilized A.C. amplifier 85 is connected to the output terminals 82, 82' in order to provide appropriate signal levels from the Hall generator 20 to the linear rectifier 52 for the remainder of the system shown in FIG. 5. The signal outputs from either the Hall generator or the magneto diode are used as the reference signals for the compensating means in the system thus providing a linear response independently of the magneto-hydrodynamic effects of the fluid to be measured.

The electromagnetic flowmeter systems described have the advantages of measuring the volumetric flow rates of liquid metals with a linear output indication independently of line voltage variations and also independenlyt of the electrical properties of the liquid and temperature thereof.

The invention has been described with reference to particular embodiments. Certain changes may be made in the above construction without departing from the scope of the invention, e.g. replacing the comparison system including servo controller 54 with an equivalent system capable of accomplishing voltage comparisons between the output of linear rectifier 52 and a portion of the voltage applied across the exciter electromagnets 14, 14'. Since permanent magnets may be used to perform either or both the exciting and compensating functions of the electromagnets, the output of linear rectifier 52 in FIG. 5 could be used as a positioning signal for controlling compensating permanent magnets to as to perform the above described compensating function to achieve linearity of output indications.

What I claim as new and desire to secure by Letters Patent of the United States is:

1. A flowmeter for measuring the flow of metallic fluids comprising:
a flow conduit defining a flow axis;
exciter means for establishing a magnetic flux field substantially perpendicular to the direction of fluid flow;
means for sensing an electrical signal induced by fluid flow through the magnetic field;
means for responding to said sensing means to provide an output indication which is proportional to the flow of fluid;
means, coupled to the magnetic field established by said exciter means, for providing a reference signal directly proportional to the magnetic flux density, near the termination of the magnetic field along the flow axis; and,
means for compensating the magnetic flux density near the termination of the magnetic field along the flow axis, said compensating means responding to said reference signal to cause the field intensity to remain substantially constant, resulting in an output indication from said responding means which is linearly proportional to the flow of the fluid in a manner substantially independent of the magneto-hydrodynamic effects of the moving fluid.

2. The flowmeter of claim 1, additionally comprising means for heat insulating said flow conduit from said remaining elements.

3. The flowmeter of claim 1, wherein said means for providing a reference signal includes a magneto diode and means for heat insulating said diode.

4. The flowmeter of claim 1, wherein said means for providing a reference signal includes a Hall generator and means for heat insulating said generator.

5. The flowmeter of claim 1, wherein said means for providing a reference signal includes an oscillating search coil coupled to the magnetic flux field of said exciter means.

6. The flowmeter of claim 1, wherein said compensating means includes means for magnetically sustaining the magnetic flux density, near the termination of the magnetic field along the flow axis, to substantially the same relative flux distribution present when the fluid is at rest in said conduit so that said compensating means acts in proportional opposition to the direction of displacement of the magnetic field, along the flow axis, caused by the action of electrical currents circulating in the movng fluid.

7. The flowmeter of claim 6, wherein said magnetic sustaining means includes a first electromagnet disposed downstream of said sensing means and a second electromagnet disposed upstream of said sensing means, both of said electromagnets being coupled to said exciter means, said downstream electromagnet being polarized with respect to said exciter means to substantially cancel that portion of the magnetic flux field shifted downstream under the action of moving fluid and said upstream electromagnet being polarized with respect to said exciter means to substantially replace that portion of the magnetic flux field present when the field in said flow conduit is at rest.

8. The flowmeter of claim 6 wherein said compensating means further includes means for outputting a variable direct current voltage in response to said reference signal, said magnetic sustaining means being directly coupled to said outputting means.

9. In a flowmeter for measuring the flow of fluids, wherein there is provided: a flow conduit defining a flow axis; exciter means, provided with a direct current voltage, for establishing a direct current magnetic flux field substantially perpendicular to the direction of fluid flow; means for sensing an electrical signal induced by fluid flow through the magnetic field; and means for responding to said sensing means to provide an output indication which is proportional to the flow of fluid, the improvement comprising:
means coupled to the magnetic field established by said exciter means, for providing a reference signal directly proportional to the magnetic flux density, near the termination of the magnetic field along the flow axis;
means for comparing the reference signal with a precalibrated portion of the voltage provided to said exciter means, said comparing means outputting an error control signal; and,
means for compensating the magnetic flux density near the termination of the magnetic field along the flow axis, said compensating means responding to said error control signal to cause the field intensity to remain substantially constant resulting in an output indication from said responding means which is linearly proportional to the flow of a metallic fluid in a manner substantially independent of the magneto-hydrodynamic effects of the moving fluid.

10. The flowmeter of claim 9, additionally comprising means for heat insulating said flow conduit from said remaining elements and wherein said means for providing a reference signal includes an oscillating search coil coupled to the magnetic flux field of said exciter means.

11. The flowmeter of claim 10, wherein said means for producing a reference signal also includes rectifier means for linearly converting the potential difference across said search coil to a direct current potential.

12. The flowmeter of claim 11, wherein said comparing means includes a voltage dividing network connected across the voltage provided to said exciter means, said voltage dividing network including a potentiometer having a movable contact adapted to hunt from a first position, corresponding to fluid at rest in said conduit, in order to provide a variable direct current voltage output proportional to the direct current potential from said rectifier means.

13. The flowmeter of claim 12 wherein, said comparing means also includes means, responsive to the direct current potential from said rectifier means, for controlling the position of the movable contact of said potentiometer according to a predetermined calibration characteristic for the particular fluid flowing in said conduit, in order to output the error control signal for controlling said compensating means.

References Cited

UNITED STATES PATENTS

| | | | |
|---|---|---|---|
| 3,339,410 | 9/1967 | Stern | 73—194 |
| 3,380,301 | 4/1968 | Mannherz et al. | 73—194 |

FOREIGN PATENTS

| | | | |
|---|---|---|---|
| 802,017 | 9/1958 | Great Britain | 73—194 |
| 888,222 | 1/1962 | Great Britain | 73—194 |

CHARLES A. RUEHL, Primary Examiner